(No Model.)
J. F. ELLIOTT.
TOASTER.
No. 590,478. Patented Sept. 21, 1897.
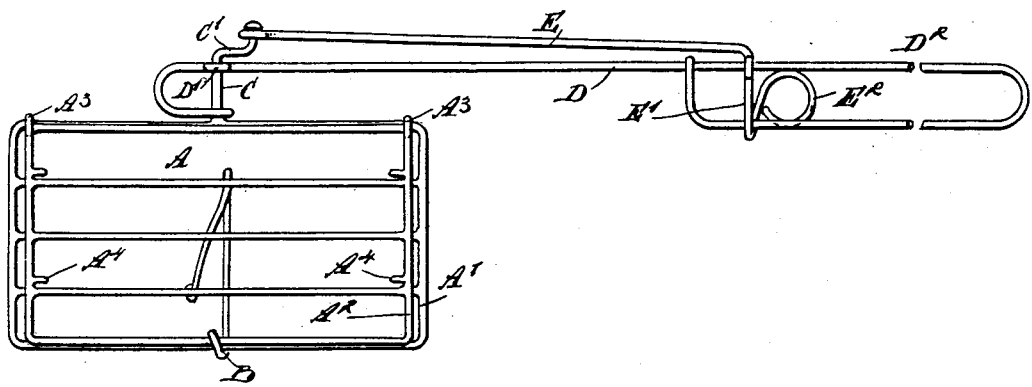
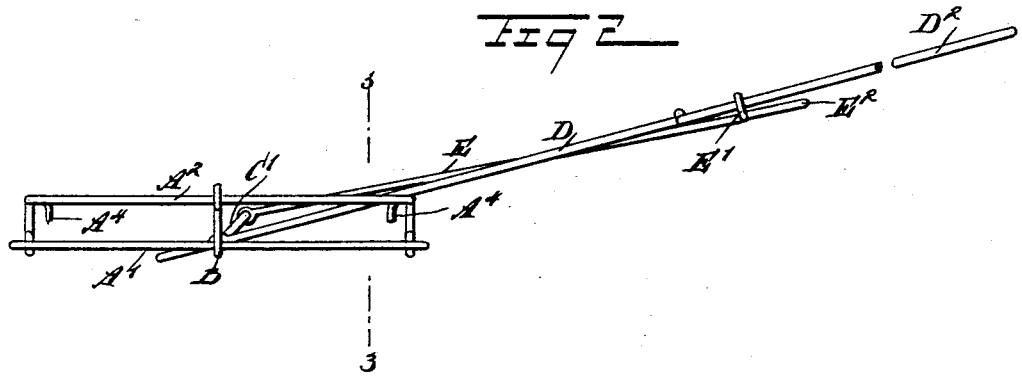
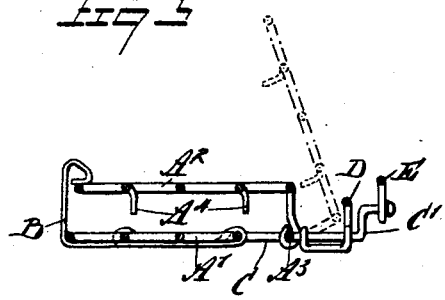
WITNESSES:
INVENTOR
BY
ATTORNEYS.

UNITED STATES PATENT OFFICE.

JAMES F. ELLIOTT, OF MANSON, IOWA.

TOASTER.

SPECIFICATION forming part of Letters Patent No. 590,478, dated September 21, 1897.

Application filed April 22, 1897. Serial No. 633,307. (No model.)

*To all whom it may concern:*

Be it known that I, JAMES F. ELLIOTT, of Manson, in the county of Calhoun and State of Iowa, have invented a new and Improved Toaster, of which the following is a full, clear, and exact description.

The object of the invention is to provide a new and improved toaster which is simple and durable in construction, easily manipulated, and more especially designed for toasting bread and other food products, the toaster being arranged to permit the operator to properly expose the article to the fire to insure toasting on all sides.

The invention consists principally of a basket formed by two leaves pivotally connected with each other and adapted to receive between them the article to be toasted, a crank-shaft extending from one of the leaves and provided at its outer end with a crank-arm, a manually-operated crank-rod connected with the said crank-arm and a handled frame provided with bearings for the said shaft to turn in and with a bearing for the outer end of the rod to slide on.

The invention also consists of certain parts and details and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a plan view of the improvement. Fig. 2 is a side elevation of the same, and Fig. 3 is a transverse section of the same on the line 3 3 of Fig. 2.

The improved toaster is provided with a basket A, formed with a rear or bottom leaf A' and a top leaf $A^2$, pivotally connected at $A^3$ with the rear leaf A', as is plainly illustrated in the drawings. The bread or other article of food to be toasted is placed between the two leaves A' and $A^2$ at the time the leaf $A^2$ is in an open position. The leaf $A^2$ is then closed and locked in place at its free end by a suitable catch B, held on the free end of the rear or bottom leaf A'.

On the ends of the top leaf $A^2$ are formed downwardly and inwardly curved projections $A^4$ to prevent the article to be toasted from sliding out between the leaves in case the article is thinner than the distance between the two leaves. On one of the leaves, preferably on the bottom leaf A', is secured or formed a shaft C, extending from one side of the said leaf near the middle thereof in the same plane as the leaf, and this shaft is mounted to turn in bearings D', formed at one end of a frame D, the frame being formed at its other end with a handle $D^2$, adapted to be taken hold of by the operator using the device. On the outer end of the shaft C is secured or formed a crank-arm C', pivotally connected with a rod E, formed with a head E', mounted to slide on a portion of the handle $D^2$, the latter thus forming a bearing for the said head. On the head E' is formed or secured a loop or ring $E^2$, adapted to be engaged by one of the fingers on the hand of the operator having hold of the handle $D^2$.

The crank-arm C' stands at an angle to the plane of the leaf A', so that the crank-arm in either of its innermost or outermost positions permits of holding the frame D at an angle to the basket, as plainly shown in Fig. 2.

Now when it is desired to use the article the bread or other food product is locked between the two leaves, and then the operator takes hold of the handle $D^2$ and with one finger engaging the loop or ring $E^2$. The operator can now readily place the toaster to the fire, so as to toast the article on one side, and then by moving with his finger the head E' forward or backward on the handle $D^2$ the basket is given half a turn to bring the other side next to the fire. In a like manner the ends and sides of the article can be toasted by holding the handle $D^2$ accordingly and turning the basket by the use of the crank-arm C', rod E, and shaft C.

In all cases the hand of the operator is a suitable distance away from the fire, and consequently not liable to be scorched while manipulating the basket.

It is expressly understood that the basket can be held in a horizontal, vertical, or endwise position by holding the frame D accordingly. Thus by a slight movement of the finger in the loop $E^2$ the operator is enabled to make all the necessary adjustments without touching the bread or the hot wire forming the basket.

Having thus fully described my invention,

I claim as new and desire to secure by Letters Patent—

A toaster comprising a toasting-basket, having a crank-shaft projecting laterally from one side edge, a handled rod at one side of the basket, the rod having a coil near its forward end forming a bearing, the rod being continued beyond said coil, then return bent and given a second coil to form a second bearing, the two bearings being at one side of the basket and receiving the crank-shaft, and an operating-rod engaging the crank-arm of the crank-shaft and extending rearwardly to an engagement with the handled rod, substantially as described.

JAMES F. ELLIOTT.

Witnesses:
J. EMERSON GREENFIELD,
DAVID P. SMITH.